Patented Dec. 8, 1931

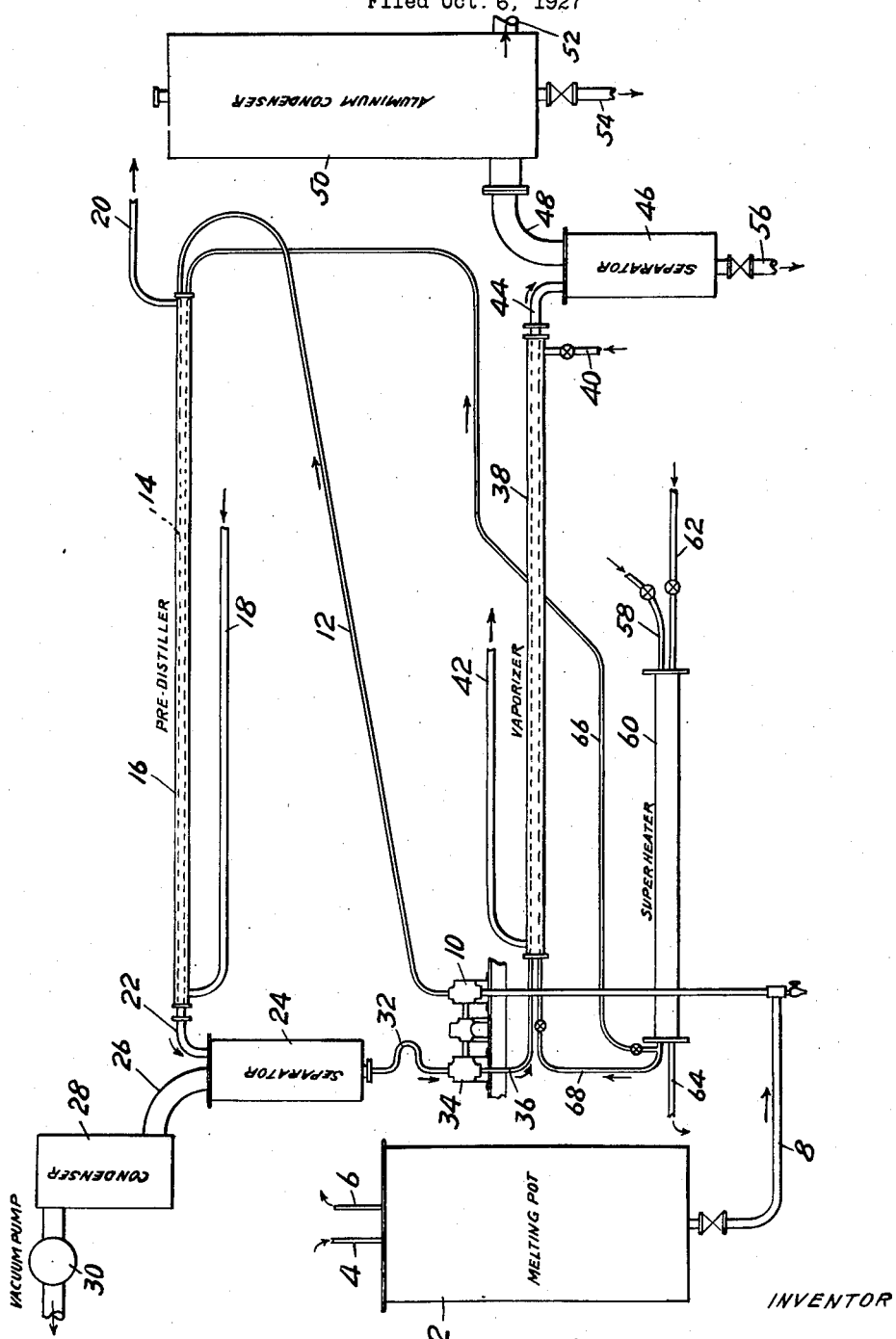

1,835,063

UNITED STATES PATENT OFFICE

ARTHUR LANGMEIER, OF DOVER, NEW JERSEY, ASSIGNOR TO HERCULES POWDER COMPANY, OF WILMINGTON, DELAWARE, A CORPORATION OF DELAWARE

PROCESS OF REFINING ROSIN

Application filed October 6, 1927. Serial No. 224,326.

This invention relates to a process of refining wood rosin by distillation and more particularly relates to an improvement upon the methods of distillation disclosed in the applications of Harry E. Kaiser and Arthur Langmeier, filed May 15, 1923, Serial Number 639,054 and George E. Jenks, filed May 15, 1923, Serial Number 639,064.

A common method of recovering rosin from wood consists in treating wood stock, from which the turpentine has been removed by steam, with a solvent such as gasoline which extracts chiefly rosin, pine oil and various coloring bodies. The solution thus obtained is fractionally distilled to recover the gasoline and pine oil, and a low grade rosin remains which because of its color is unsuitable for use in varnish or soap of high grade or in sizing white paper.

The low grade rosin may be refined by distillation under a vacuum during treatment with superheated steam followed by fractional condensation carried out in accordance with the disclosures in the applications referred to above.

The object of this invention is the improvement of the above process whereby larger yields of high grade rosin may be obtained.

The improved process will be best understood after a detailed description thereof with reference to the accompanying drawing in which is represented a diagrammatic elevation of an apparatus suitable for carrying out the process.

Low grade rosin is melted in a melting pot 2 by means of steam entering and leaving a steam coil or jacket through pipes 4 and 6 respectively. The molten rosin passes from the melting pot through a pipe 8, which may advantageously be jacketed to avoid radiation losses, to a pump 10 which forces the rosin through pipe 12 into the inner tube 14 of a pre-distiller. Tube 14 of the pre-distiller is surrounded by a jacket 16 through which oil is circulated to heat the rosin, the oil entering through pipe 18 and leaving through pipe 20. The rosin is heated in the pre-distiller to a temperature which will be sufficiently high to vaporize any low boiling coloring matter which it contains, a suitable temperature being between 464° F. and 500° F.

The mixture of vapors and unvaporized rosin pass from the pre-distiller through a pipe 22 into a separator 24 which contains suitable baffles to cause the mixture to reverse its direction at least once to separate, as far as possible, the vapors from the liquid rosin. The vapors pass from the separator through a pipe 26 into a condenser 28, in which the greater part of the volatile matter and water, introduced, as will be seen, into the pre-distiller as superheated steam, will condense. Condenser 28 is connected to a vacuum pump, indicated at 30, which maintains the system consisting of the pre-distiller, separator and condenser under a high vacuum, a suitable pressure being about ¼ inch to 5 inches of mercury.

The rosin passes from the separator through pipe 32 to a suitable pump or feed cock 34 from which it passes through pipe 36 into the inner tube of a vaporizer 38, similar in construction to the pre-distiller and heated by oil entering its outer jacket at 40 and leaving at 42. In the vaporizer the rosin is heated to a high temperature, preferably about 500° F. or 575° F., a temperature which, especially in the presence of superheated steam, is sufficient to vaporize the distillable rosin.

The mixture of rosin vapors, decomposition products, unvaporized material and any dark low volatiles remaining from the pre-distillation, pass through pipe 44 into a separator 46, which may be similar to separator 24, in which the liquid material is removed from the vapors which pass into a condenser or series of condensers, only one of which is indicated at 50 in the drawing. Preferably a series of condensers is employed which are maintained at successively decreasing temperatures to afford a fractional condensation, the condensers being maintained at suitable temperatures by means of heated jackets. If three condensers are used, for example, their temperatures may advantageously be 400° F., 350° F. and 300° F.

The outlet 52 from the condensers communicates with a condenser and scrubber, which may be of the type shown in the applications above referred to, and in which a circulating stream of solvent such as gasoline dissolves the rosin and rosin oil. Any water is here condensed and may be separated from the solvent which is circulated through the scrubber until saturated, at which time it may be replaced by fresh solvent. The scrubber is connected with a vacuum pump which maintains a high vacuum in the vaporizer, separators, and condenser. The pressure in the vaporizer should be about ¼" to 2 inches of mercury since at a pressure of 3 inches or above the distillation becomes sluggish.

Liquid condensate is drawn from the condensers through an outlet 54. Low grade rosin may be recovered from the separator 46 through an outlet 56.

In order to accomplish distillation at lower temperatures and thus prevent excessive decomposition, steam is passed at 58 into a superheater 60 which may be advantageously heated by oil returning from the pre-distillation tube or vaporizer, entering at 62 and leaving at 64. The temperature of the superheated steam entering the pre-distiller is preferably about 575° F. while that entering the vaporizer is preferably also about 575° F. The superheated steam passes through pipes 66 and 68 into the pre-distiller and vaporizer respectively.

While oil has been described as the heating medium for the pre-distiller and vaporizer, it is, of course, obvious that any other suitable heating medium could be employed, for example, high pressure steam, mercury, fused salts, alloys, or properly controlled direct heat. It will be noted that the heating in the pre-distiller and vaporizer is accomplished by a counterflow of heating medium and rosin. By this arrangement not only the usual advantageous results of counterflow heating are obtained but owing to this counterflow and also to the use of a horizontal tube positive flow evaporator, there is a minimum of contact of the rosin with the heating medium for short periods of time whereby it is found that a much more complete separation of coloring matters of low volatility is effected in the pre-distiller and much less spray is formed and carried into the condensers from the vaporizer. This spray is condensed only with difficulty and besides contaminating the high grade product it tends to clog the vacuum line and prevent its proper operation. Whereas in the process described in the applications above referred to a yield of 70% of the distillable rosin is obtained as high grade rosin, and whereas much trouble is encountered from the production of spray formed by the decomposition of the rosin during the heating, the process described herein will yield as high as 98% of the distillable rosin as high grade rosin with much less decomposition, high grade rosin being defined as that which is suitable for the sizing of white paper and the production of high grade varnishes or soaps.

It will be understood that the apparatus shown and described is diagrammatic only and is only a simple form suitable for carrying out the process. Either the pre-distiller or vaporizer may consist of a plurality of tubes arranged in any suitable way to secure a minimum of contact of the rosin with the heating medium while flowing. The control of the heating may also be accomplished in any suitable manner without departing from the spirit of the invention.

What I claim and desire to protect by Letters Patent is:

1. The process of refining rosin which includes heating the rosin at a temperature not substantially above 500° F. to distill off components of low volatility while passing into the molten rosin superheated steam and subsequently distilling distillable rosin from the residue.

2. The process of refining rosin which includes heating the rosin under reduced pressure at a temperature not substantially above 500° F. to distill off components of low volatility while passing into the molten rosin superheated steam and while causing the molten rosin to flow relatively to a heating surface contacting therewith and subsequently distilling distillable rosin from the residue.

3. The process of refining rosin which includes heating the rosin at a temperature not substantially above 500° F. to distill off components of low volatility while causing the molten rosin to flow relatively to a heating surface contacting therewith, the temperature of said heating surface increasing in the direction of flow and subsequently distilling distillable rosin from the residue.

4. The process of refining rosin which includes heating the rosin under reduced pressure at a temperature not substantially above 500° F. to distill off components of low volatility while causing the molten rosin to flow relatively to a heating surface contacting therewith, the temperature of said heating surface increasing in the direction of flow and subsequently distilling distillable rosin from the residue.

5. The process of refining rosin which includes heating the rosin at a temperature not substantially above 500° F. to distill off components of low volatility while passing into the molten rosin superheated steam and while causing the molten rosin to flow relatively to a heating surface contacting therewith, the temperature of said heating surface increasing in the direction of flow and subsequently distilling distillable rosin from the residue.

6. The process of refining rosin which includes heating the rosin under reduced pressure at a temperature not substantially above 500° F. to distill off components of low volatility while passing into the molten rosin superheated steam and while causing the molten rosin to flow relatively to a heating surface contacting therewith, the temperature of said heating surface increasing in the direction of flow and subsequently distilling distillable rosin from the residue.

7. The process of refining rosin which includes heating the rosin at a temperature not substantially above 500° F. to distill off components of low volatility, and subsequently distilling the rosin while causing it to flow relatively to a heating surface contacting therewith and condensing the rosin vapors, the temperature of said heating surface increasing in the direction of flow.

8. The process of refining rosin which includes heating the rosin at a temperature not substantially above 500° F. to distill off components of low volatility, and subsequently distilling the rosin under reduced pressure while causing it to flow relatively to a heating surface contacting therewith and condensing the rosin vapors, the temperature of said heating surface increasing in the direction of flow.

9. The process of refining rosin which includes heating the rosin at a temperature not substantially above 500° F. to distill off components of low volatility, and subsequently distilling the rosin while passing thereinto superheated steam and while causing it to flow relatively to a heating surface contacting therewith and condensing the rosin vapors, the temperature of said heating surface increasing in the direction of flow.

10. The process of refining rosin which includes heating the rosin at a temperature not substantially above 500° F. to distill off components of low volatility, and subsequently distilling the rosin under reduced pressure while passing thereinto superheated steam and while causing it to flow relatively to a heating surface contacting therewith and condensing the rosin vapors, the temperature of said heating surface increasing in the direction of flow.

In testimony of which invention, I have hereunto set my hand, at Wilmington, Delaware, on this 27th day of September, 1927.

ARTHUR LANGMEIER.